United States Patent Office 3,464,205
Patented Sept. 2, 1969

3,464,205
SELF-CONTAINED HYDRAULIC POWER
TRANSMISSION UNITS
Edmond Henry-Biabaud, Paris, France, assignor to
Societe Anonyme Andre Citroen, Paris, France
Filed May 29, 1967, Ser. No. 641,792
Claims priority, application France, June 16, 1966,
65,744
Int. Cl. F16d *31/06, 33/00*
U.S. Cl. 60—53                                              4 Claims

ABSTRACT OF THE DISCLOSURE

Power transmission unit comprising hydraulic pump and motors of the multicylindered rotary barrel type with distributor faces and means for varying the volumetric capacity of said hydraulic motors, characterised in that it comprises essentially two portions, namely a central main body forming an integral unit supporting the main stresses and a peripheral protection housing also acting as a fluid reservoir, both portions being an integral part of the self-contained unit.

---

The present invention relates to a hydraulic power transmission unit designed for driving a mechanical assembly, machine or vehicle, and is concerned more particularly with a self-contained device closely connected to an internal combustion engine producing the primary energy, which has a high degree of compactness with a view to reduce over-all dimensions and increase the necessary rigidity of the unit.

To this end the unit structure comprises essentially on the one hand a main body to which the main stresses are applied while affording the best possible balancing of the various reactions, and on the other hand a case constituting both a protection housing and a fluid reservoir surrounding said main body.

This mode of construction permits on the one hand an easy maintenance due to the accessibility resulting from the choice and position of the mounts, and on the other hand an improved reliability resulting both from the stress reduction thus obtained and from the substantial reduction in the length of the hydraulic circuits and the improved protection not only of these circuits but also of the various component elements of the unit, whereby undesired and detrimental leakages are safely avoided.

These and other objects and advantages of this invention will appear as the following description proceeds with reference to the accompanying drawing illustrating diagrammatically by way of example a typical form of embodiment of this invention. In the drawing.

Figure 1:
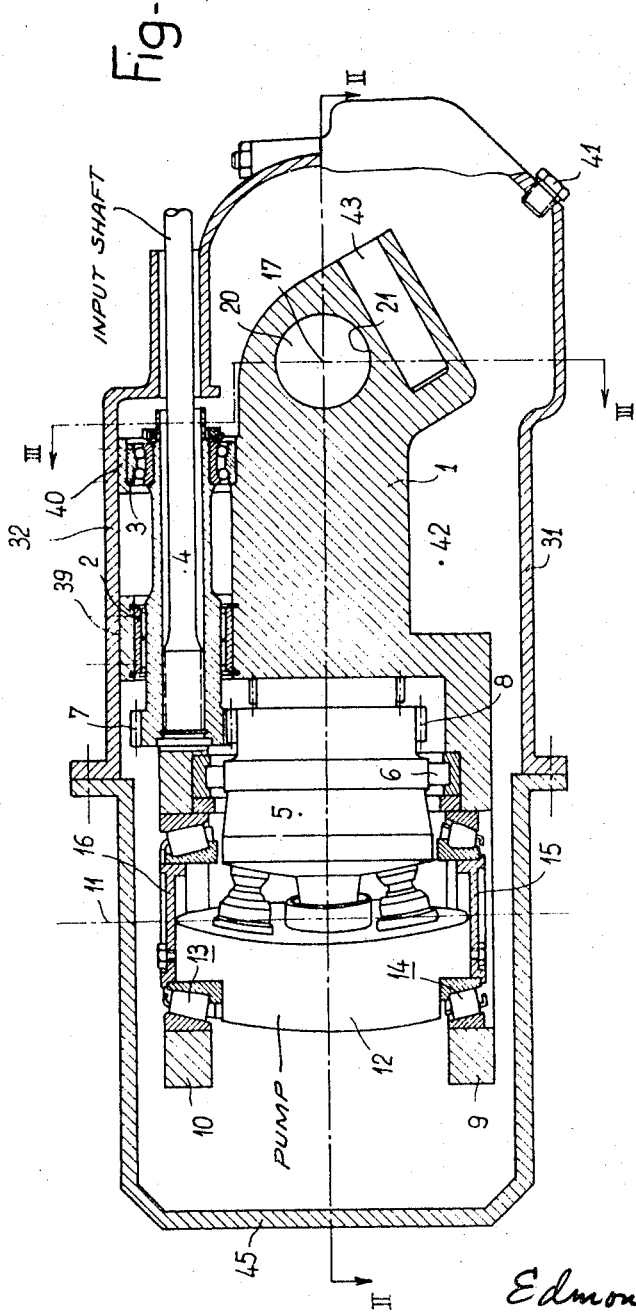
FIGURE 1 is an axial section showing the hydraulic power transmission unit constituting the subject-matter of this invention, the section being taken along the line I—I of FIGURE 2.
Figure 2:
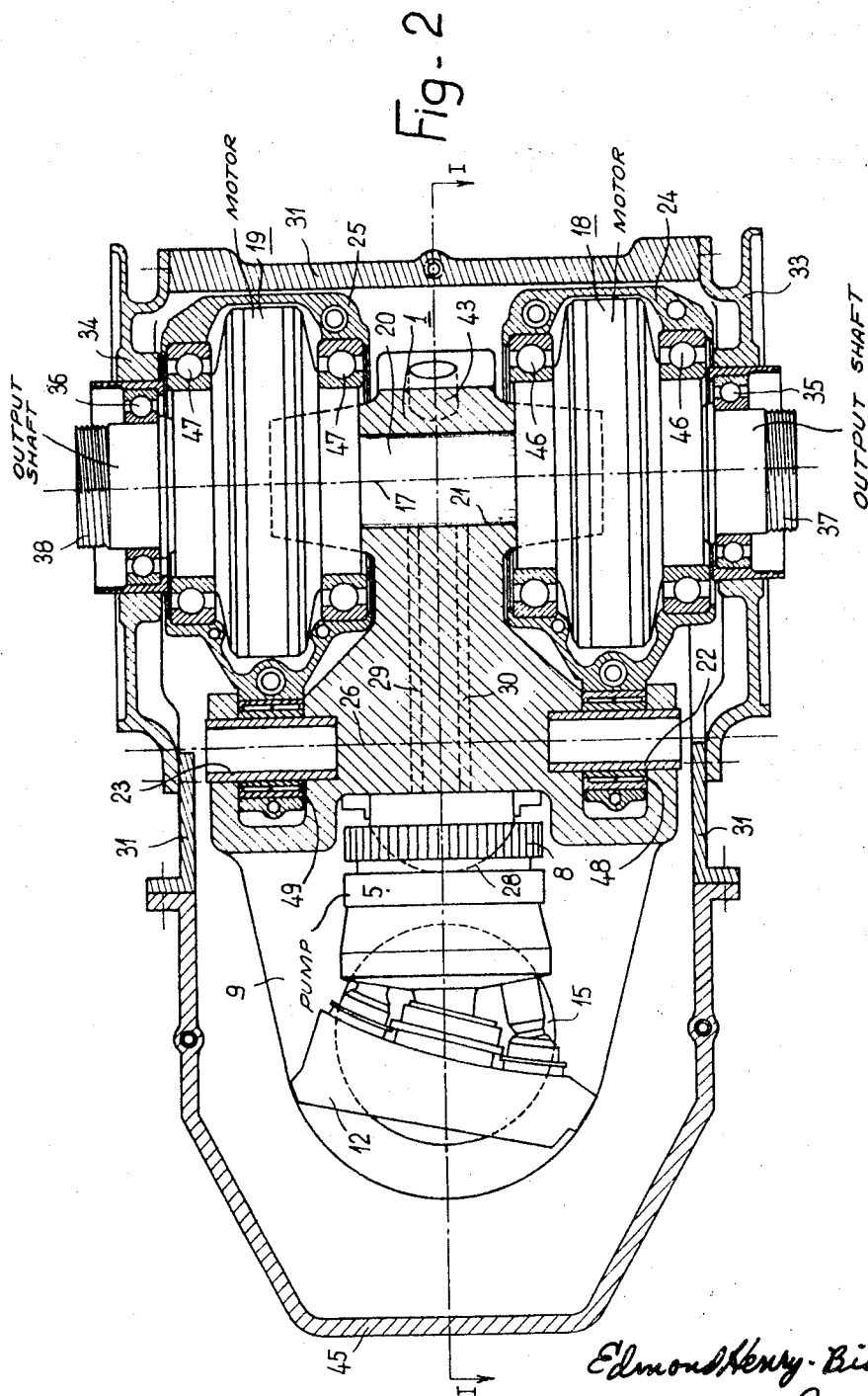
FIGURE 2 is a fragmentary section taken along a horizontal plane II—II of FIGURE 1.
Figure 3:
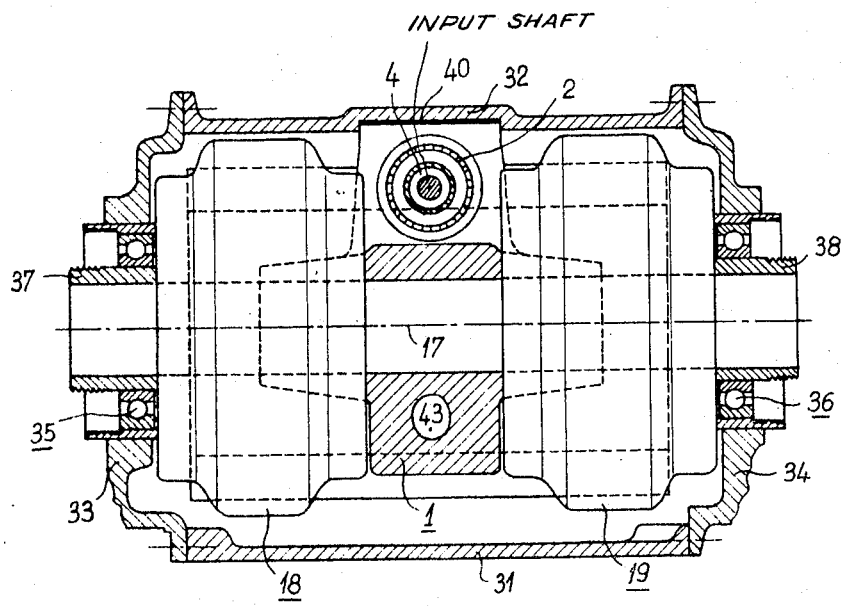
FIGURE 3 is a section taken along the broken line III—III of FIGURE 1.

The main solid body 1 shown in FIGURE 1 withstands extremely high stresses and reactions from the various component elements of the unit during its operation, these elements being essentially:

The bearings 2 and 3 of the shaft 4 driving from an internal combustion engine (not shown) the rotary barrel pump 5;

The barrel 5 of the pump or pressure generator which is rotatably mounted in a bearing 6 about the axis II—II and rotatably driven through a pinion 7 rotatably rigid with said shaft 4 and in meshing engagement with an annular set of teeth 8 formed on said barrel;

The part-spherical inclined plate 12 for adjusting the volumetric capacity of the pump, which is adapted to be adjusted about an axis 11 between a pair of opposite roller-bearings 13 and 14 mounted on annular members 15 and 16 respectively and fitted in arms 9 and 10 rigid with said main body 1;

The hydrostatic motors 18 and 19 (FIGURE 2) having their barrels adapted to revolve about a common cylindrical distributor 20 force-fitted in the bore 21 machined in the rear portion of said main body;

The pivot pins 22 and 23 of a pair of arms 24 and 25 carrying cylindrical tracks for adjusting the volumetric capacity of said motors 18 and 19 by varying their eccentric position in relation to the axis 17 of distributor 20 so as to cause said arms to pivot about their common geometrical axis of rotation 26. On the other hand, said main body 1 acts as a bearing, with its face 27, to a part-spherical floating distributor 28 of the pump; besides, bores 29 and 30 are formed therein to constitute a short and particularly reliable circuit for supplying power fluid to the motor distributor 20 as said fluid is delivered from the pump distributor 28.

The recess 42 formed in the lower portion of the solid body 1 encloses the valve means of the regulating system permitting the automatic operation of the unit.

The cylindrical bore 43 formed in this main body 1 is adapted to receive the hydraulic actuators for adjusting the volumetric capacity of the hydraulic motors 18 and 19 for controlling the pivotal movements of the rigidly interconnected arms 24 and 25 about the axis 26.

The lower and upper shells 31 and 32 to which lateral flanged covers 33 and 34 are adapted to be secured for centering the members 37 and 38 are provided for driving wheels or output shafts, adequate packings and if necessary ball-bearings 35 and 36 being interposed therebetween, as shown.

The housing can be secured to the main solid body 1 by means of its upper shell 32, by using any suitable and known fastening or mounting means, along their contact surface 39.

The unit is adapted to be secured to the frame or like structure of a machine or vehicle by using suitable members disposed in the power input and output zone corresponding substantially to the points whereat the housing is secured to the central body 1.

The housing is made fluid-tight by closing same with an end-cap 45 surrounding the pump assembly. A screw plug 41 is provided at the lowermost point of the housing to permit the draining thereof.

The above-described form of embodiment should not be construed as limiting the scope of the invention since many modifications and variations may be brought thereto, and many different combinations and mutual disposals of its component elements may be contemplated without inasmuch departing from the spirit and scope of the invention as set forth in the appended claims.

Thus, the main body 1 is refered to as a one-piece member but to avoid undue complications in its manufacture this member may consist of two or more sections. In this case, for example, the adjustable part-spherical plate for modifying the volumetric capacity of the pump has its bearings secured by means of studs or pins to the body of the main element 1, instead of being cast integrally with the body 1.

Similarly, the sturdiness of the assembly would not be impaired by securing, inserting and/or incorporating certain component elements or duct means to or in the housing with a view to facilitate the assembling and maintenance of the unit.

Of course, the various modifications and different forms of embodiment of this invention which may be brought or contemplated in practice cannot interfere with the reliability of the assembly which results mainly from the self-contained structure constituting the basic principle of the invention, with short hydraulic circuits efficiently protected to this end, while affording a maximum accessibility to the different component elements, and facilitating the adjustment on the test bench as well as the proper positioning of the fastening points or mounts selected with a view to reduce undue strain and to use the housing almost exclusively as a means for protecting the assembly and constituting a fluid reservoir.

On the other hand, it is obvious that the unit can be driven from any adequate source of primary power, not only from an internal combustion engine, and that it can be used for driving not only automotive vehicles but also any machine requiring for its operation the application of a mechanical driving power with a wide range of speeds from a machine of reduced over-all dimensions.

Similarly, motors of the rotary barrel type may be substituted for the radial-cylindered motors illustrated; in this case, the pivot axes of the circular tracks would be replaced by those of the impulse plates, also connected to the main body and converging to the distributor axes.

I claim:

1. Hydrostatic transmission group comprising a pump driven by an exterior motor, two hydraulic motors driven by the liquid under pressure from said pump, said pump and motor being of the multi-cylindered rotary barrel type with distributor faces and means for varying the volumetric capacity of said hydraulic motors, a central body extending in an axial direction, said barrel pump being supported by said body along said axial direction, said motor being supported by said body along an axis perpendicular to said axial direction, a secondary distributor disposed along said perpendicular axis feeding said motors, said central body having longitudinal borings connecting said pump to said distributor, a driving shaft extending parallel to said axial direction, bearings for said shaft supported by said body, means connecting said driving shaft and said pump and a protection casing enclosing said elements serving as a reservoir for the liquid, said central body having on one end a recess housing in which engages said pump, and two arms extending parallel to said axial direction on each side thereof forming bearings for a transverse pivoting axle rigid with an adjusting plate of said pump, said central body having also two pivot pins symmetrically disposed and perpendicular at both said axial direction and said transverse axle, said pivot pins carrying cylindrical tracks forming said varying means of the volumetric capacity of said hydraulic motors.

2. A transmission group according to claim 1 wherein said central body comprises two bearings of the pump pivoting plate secured to said body.

3. A transmission group according to claim 1, wherein said body incorporates valve means and hydraulic regulating means.

4. A transmission group according to claim 1 wherein wheel driving members constituting the outer extensions of the motor barrels extend through and position members to close said casing with packing and bearing means interposed therebetween.

References Cited

UNITED STATES PATENTS

| | | | |
|---|---|---|---|
| 1,628,603 | 5/1927 | Ferris | 60—53 XR |
| 2,163,079 | 6/1939 | Benedek | 60—53 |
| 2,993,339 | 7/1961 | Timms | 60—53 |
| 3,165,069 | 1/1965 | Adamek | 60—53 XR |
| 3,279,172 | 10/1966 | Kudo et al. | 60—53 |
| 3,293,848 | 12/1966 | Kuze | 60—53 |

EDGAR W. GEOGHEGAN, Primary Examiner